Jan. 5, 1960　　　　E. J. POITRAS　　　2,919,740
BELLOWS-FORMING METHOD AND APPARATUS
Filed Sept. 8, 1953　　　　　　　　　　　　2 Sheets-Sheet 1
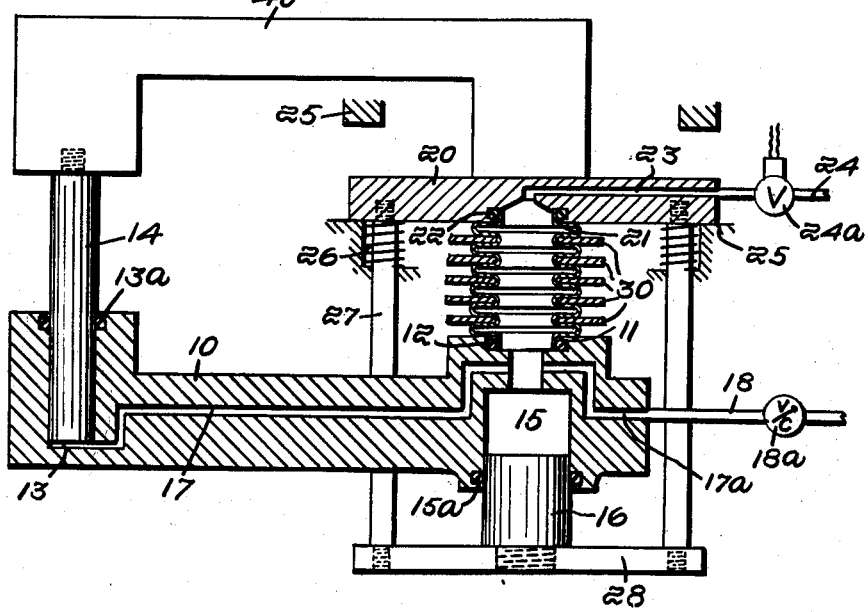
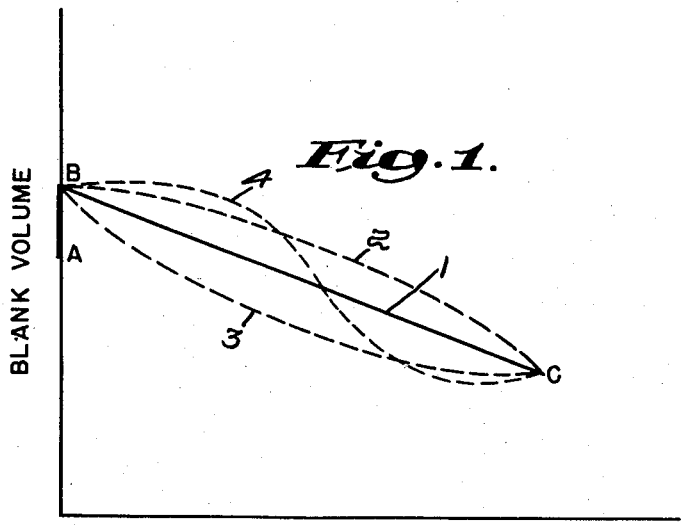
Inventor:
Edward J. Poitras
by Emery, Booth, Townsend, Miller & Widner
Attorneys

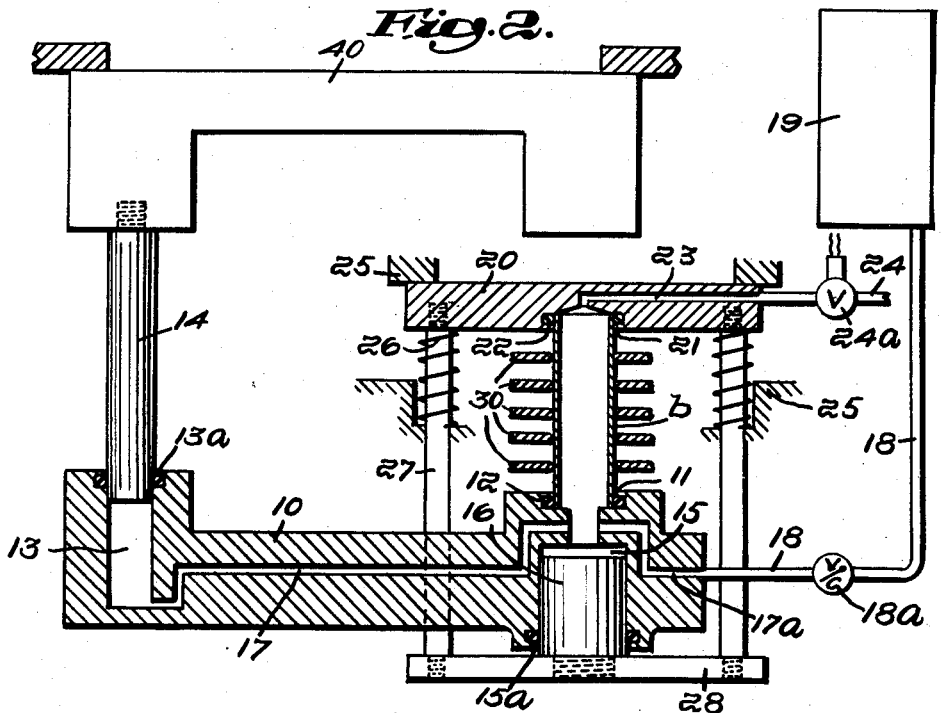
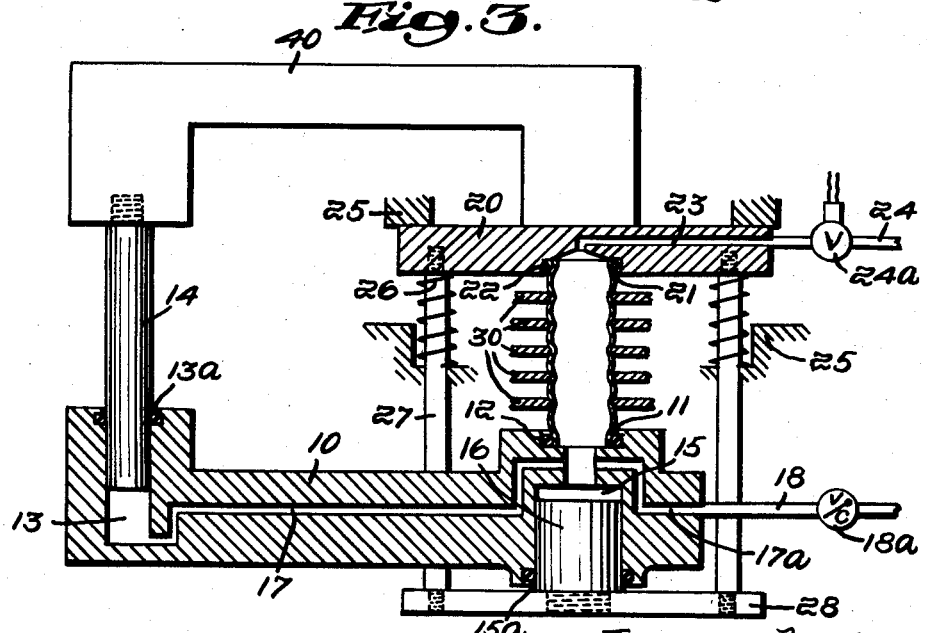

United States Patent Office 2,919,740
Patented Jan. 5, 1960

2,919,740

BELLOWS-FORMING METHOD AND APPARATUS

Edward J. Poitras, Holliston, Mass.

Application September 8, 1953, Serial No. 378,957

2 Claims. (Cl. 153—73)

The present invention relates generally to bellows manufacture and more particularly to an improved method and apparatus for forming corrugations or convolutions in the longitudinal walls of tubular or cup shaped elements. The corrugating of such generally thin-walled tubes or cups is novelly effected under the method of the invention by the control of a fluid volume sealed in communication therewith. The invention provides also a unique and altogether simple and efficient apparatus for manipulating said tube- or cup-connected volume in accordance with said volume control method.

The bellows-forming methods of the prior art have been universally characterized by the initial application of a controlled fluid pressure as for desired preliminary bulging of the tubular blank and by the following application of an axially contracting force as accompanied by the continuing control and/or relief of the fluid pressure in the said tubular blank or work piece. The tubular and cup shaped blanks are subjected to this bulging pressure and contracting force in a forming device or mold comprising spaced tube-side-engaging die rings intermediate relatively movable tube-end-engaging die plates. The longitudinal walls of the blank will be understood to be urged or bulged radially outwardly, between and about the rounded in-facing mold or die-ring surfaces which are drawn together or collapsed upon this annular corrugating and by the following application of the mentioned axially contracting force. The known methods are thus concerned primarily with the control and/or relief of the pressure in the tube blank. Accordingly the present invention departs basically and radically from the prior bellows-forming practice in the total disregard of the mentioned fluid pressures and by the control and manipulation instead of a sealed tube-connected fluid volume.

The invention will be better understood from a consideration of the following specification in conjunction with the accompanying drawing in which:

Fig. 1 is a graph presenting exemplary applications of the invention principle;

Fig. 2 is a partly schematic view of an invention apparatus assembled with a tube blank in readiness for manipulation in accordance with my novel method;

Fig. 3 is a similar showing of the apparatus and blank in an intermediate bellows-forming position; and Fig. 4 shows the apparatus and corrugated tube as finally positioned in accordance with the invention method.

It is generally recognized that bellows manufacture as conventionally practiced is attended by natural difficulties and disadvantages. The indicated prior emphasis and reliance on pressure control and/or relief has compelled the use of elaborate fluid systems incorporating variously pumping means, accumulators, equalizers, check valves, reducing valves, relief valves and the like high pressure fluid supply and control devices. Changes in the specifications and dimensions of the blank or work pieces have necessitated lengthy, tedious adjustment of these control devices some of which have grown sufficiently complex to involve also frequent component adjustment to a given pressure setting.

Despite the development of the mentioned fluid pressure supplying and controlling systems, bellows manufacture has remained hazardous, and complicated by the generation or build-up of yield-point-exceeding internal fluid pressures, such that the wall thickness of bellows tubing has had to be closely controlled, and only high quality special analysis metals have been considered suitable and satisfactory for bellows manufacture. Thus the prior or conventional bellows-forming practice may generally be characterized as a relatively difficult and exacting process, requiring relatively costly and complicated equipment.

An object of the present invention is to provide an improved method of manufacturing bellows, and more particularly a method which may be carried out more quickly and easily than any heretofore known to the art, and which lends itself to a simple and efficient type of apparatus. A further and primary object of this invention is to provide a bellows-forming method which is characterized by manipulation of a fluid volume and which eliminates the supply and control of fluid pressure.

A still further important object of the invention is to provide an improved bellows-forming method which lends itself novelly to the use of tubing stock which may be of varying composition and finished to ordinary commercial tolerances, and a method which is not affected by requirements and restrictions such as imposed on conventional controlled pressure methods by yield points and the like tubing specifications.

It will be useful first to consider generally the principle of volume control as applied to bellows manufacture under the invention method, and as graphically shown in Fig. 1, in which the vertical axis represents the work blank volume, and the horizontal axis represents the blank collapsing ram advance. In the shaping or forming of a bellows by any of the known as well as by the invention method, the blank volume will be understood to increase by a certain amount, then to decrease by another and relatively greater amount. In other words, in the initial operating or so-called pre-bulging phase, the blank volume increases as represented by the vertical line AB. In the succeeding ultimate or final phase, the blank volume decreases along the line BC to an amount usually less than the original value A. The volume change effected by the continued radial expansion or bulging of the tube walls during said final phase is usually more than offset by that resulting from the simultaneous axial collapse of the same. It is noted that the blank volume decrease may be proportional to ram advance as represented by the solid line 1, but it may also follow any of the infinite number of variants 2, 3, 4 of the general curve. Simply stated, the operating principle of the invention is one of manipulating the fluid volume controlling means so as to produce a net change in the blank volume which is related to the blank collapsing ram advance in accordance with one or more of the curves of Fig. 1. In other words, the relationship between the position of the ram and that of the volume manipulating means is so ordered as to produce the desired schedule of length or stroke versus volume of the blank or work piece.

The invention principle is well demonstrated by the operation of the exemplary apparatus of Figs. 2 to 4 inclusive of the drawing, which apparatus comprises generally a pair of opposed tube-end-engaging members 10, 20 spaced by a tube-side-engaging assembly of rings 30 and manipulable by a motion-producing device 40. The lower such member 10 consists in the illustrated embodiment of a rigid elongate frame element or die plate of random horizontal section horizontally fixedly supported in any desired or convenient manner. Said lower die plate 10 has at one end and in its upper face a relatively shallow vertical annular recess 11. This recess is seen to be proportioned snugly and firmly to seat and support the lower end of a length of tubing, which tubing length is herein referred to and identified as the bellows tube or blank b. Some form of sealing means, such as the O-ring 12, is desirably associated with the recess 11 as for insuring a firm and fluid-tight coupling of the said blank and plate.

Having reference still to the base plate 10, the same is shown to be provided further with a pair of vertical annular recesses, slides, or chambers 13, 15 of predeterminedly differing diameters. The small diameter chamber 13 is conveniently located in a plate portion removed or remote from the recess 11, but is exposed or open similarly at the plate upper face. The relatively larger diameter chamber 15 is preferably substantially aligned vertically with the said recess 11 and is seen to be open at the opposite or lower face of the die 10. A small and a large piston 14, 16 are received and more particularly closely fitted in the chambers 13, 15, being sealed thereto as by the O-rings 13a, 15a, and sliding therein in a manner and for a purpose to be described. The said piston chambers 13, 15 are joined or connected by an internal plate passage 17, which passage is seen to communicate also with the recess 11 and blank b. The lower die fluid circuit further comprises a passage branch 17a arranged and adapted for coupling to a supply line 18 which may incorporate a conventional check valve 18a desirably located conveniently to the apparatus, and which may be fed or charged from a gravity tank 19.

Referring now more particularly to the upper die element 20, the same is shown as a rigid elongate plate member positioned and oriented opposite and parallel to the lower die 10, and mounted also for relative vertical movement. It is provided with a shallow annular recess 21 in its lower face similar and opposed to the upfacing recess 11 in said lower die plate. The recess 21 will be seen to receive the upper end of the blank b, and similarly as the recess 11 to be fitted with an O-ring or the like tube-end-engaging and sealing means 22. This upper die recess 21 communicates with an internal die or fluid passage 23, which passage is coupled to a discharge line 24, the same being fitted as with a solenoid valve 24a for closing or sealing off the passage 23 at a point convenient to the apparatus.

The invention novelly provides further for the control of the vertical closing movement of the die assembly 10, 20 by a simple and efficient means. Such means may comprise suitable and stationary upper and lower limit stops such as are given fragmentary indication at 25, Fig. 2, and some form of spring means as shown at 26 arranged to bias the upper die 20 to its initial or uppermost position when the parts are relatively disposed as shown in Fig. 2 and into engagement with the motion-producing device 40 when the same is positioned as shown in Figs. 3 and 4. The said control means may further comprise a set of rods or bars 27 supported from the plate 20 and centered through the lower stops 25 for guiding said upper die 20 in its relative closing and opening movement.

The described lower and upper die chambers and passages 13, 15, 17 and 23 will be understood to comprise in combination with the assembled bellows blank b and communicating portions also of the supply and discharge passages 18 and 24 a complete, closed or sealed fluid system or volume. In accordance with the invention this sealed fluid volume is mechanically manipulated, partly in concert with the similarly mechanically influenced closing of the dies 10, 20 so as to effect desired radial expansion of the bellows blank coincident with the axial collapse of the same. This mechanical manipulation of the fluid volume is effected by and upon the actuation of the pistons 14, 16 by the means and in the manner now to be described.

The larger piston 16 is mounted for vertical sliding movement in its chamber 15 upon and with the like movement of the upper die 20. An exemplary large piston controlling arrangement is indicated as a platform or cross arm 28 on which the piston 16 is rigidly centrally supported and which is linked to the upper die 20 as by suspension as shown from the lower extremities of the guide rods 27.

The arrangement and proportioning of the parts just described will be understood to be such that the piston 16 substantially fills the chamber 15 when the piston 16, piston mount 28, bars 27 and upper die 20 are in the initial uppermost position, Fig. 2, and such that said piston 16 is substantially withdrawn from the said chamber 15 when the said upper die 20 is depressed to its lowermost final operative position, Fig. 4. Thus as the blank-end-connected die elements 10, 20 undergo a relative closing or blank collapsing movement, the piston 16 has a similar but opposite, withdrawing or opening movement relative to its down-facing chamber 15.

The smaller piston 14 is seen to be actuated by the motion-producing device or motion-imparting means schematically shown at 40, and comprising any suitable rigid unitary punch press, ram or the like to which the said piston is fixed or coupled in any convenient manner. This ram 40 will be understood to be arranged and guided for vertical reciprocating movement similarly as the upper die 20 through a range having a downward extent inclusive of the die-closing, bellows-collapsing position indicated in Fig. 4 and importantly extending upwardly also to a point or position predeterminedly spaced from the upper die when the latter is in its respective uppermost position, as seen from Fig. 2.

In other words, the ram 40 and ram-connected or small piston 14 have an upper or initial operative position wherein the ram is spaced from the upper die 20 and the said piston is substantially withdrawn from chamber 13; a following or intermediate position wherein the ram 40 is advanced into contact with the upwardly biased upper die 20 and the small piston 14 is advanced to an intermediate position in the chamber 13, Fig. 2; and an ultimate or final position wherein the ram 40 by its further advance has depressed the upper die 20 and die-coupled piston 16 from their respective initial or Figs. 2 and 3 positions to their lower, blank-collapsing Fig. 4 positions, and the small piston 14 has advanced substantially to fill chamber 13, as clearly appears also from Fig. 4. The movement of the ram and small piston from the initial to the intermediate position will be referred to as the first or initial phase, and the following movement from the intermediate to the final position as just described will be termed the second or final phase of the operation of the invention apparatus.

In accordance with the invention, then, in the initial ram advancing phase the sealed fluid volume is affected by the downward or advancing movement of the small piston 14 only, and in the final phase the said volume is modified by the continued advance of the said small piston 14 and also by the simultaneous downward withdrawing movement of the larger piston 16. The downward advancing movement of the small piston 14 will be understood as the inward deflection of a movable wall of the said fluid volume and the coincident downward withdrawing movement of the large piston 16 as the opposite, outward deflection of another movable wall of that volume.

Considering now more fully the operation of the apparatus according to my novel method, a tubing length or bellows blank b is first seated and sealed in the die plate recesses 11, 21 as indicated in Fig. 2. Valve 18a is then opened to fill the chambers 13, 15, passages 17, 23 and blank b with a suitable hydraulic fluid from supply 19. Complete filling is assured by allowing a slight overflow through the discharge line 24 which may then be closed off as by the automatic operation of the solenoid valve 24a. There is thus provided a wholly filled, sealed and substantially incompressible fluid volume communicating with and comprehending the interior of the tube blank b, which volume is importantly characterized by movable walls in the chambers 13, 15 as already described.

The die-closing ram 40 is then actuated or advanced in a relatively rapid and continuous manner downward from its initial Fig. 2 position through the intermediate Fig. 3 position to its final bellows-tube-collapsing Fig. 4 position. In its first phase advance to a position of contact with the upper die 20 the ram 40 drives the small piston 14 downwardly to the position the latter occupies in Fig. 3, whereby a fraction of that portion of the fluid volume initially contained within the small chamber 13 is ejected or displaced. It will be readily apparent that this fluid volume fraction is shifted to or absorbed by the bellows blank b, wherein a compensating deformation or enlargement occurs, as clearly shown in Fig. 3. In absorbing this fluid volume fraction the bellows tube undergoes what is commonly known or described as an initial or preliminary radial expansion or bulging. This preliminary bulging may be more fully described as the initial radial outward bending or curving of the walls of the tube as permitted by or intermediate the tube-side-engaging assembly 30, which may comprise a set of conventional relatively movable die rings, to the position indicated in Fig. 3. It will be readily appreciated that the parts and more particularly the ram 40, the piston 14 and the described fluid volume are arranged and proportioned such that the first phase movement of the ram 40 and piston 14 shifts hydraulic fluid from the chamber 13 to the bellows tube b in an amount calculated to effect only and exactly the desired initial bulge. It is here again noted that there are no pressure control or relief valves involved in this bulging operation. As mentioned earlier in the discussion of Fig. 1, the operation of the apparatus is entirely independent of fluid pressure, only the volume being controlled.

In the following or final phase of its downward stroke the ram 40 is seen to collapse the die assembly 10, 20, 30 to the bellows-forming position of Fig. 4, and to advance the small piston 14 to its lowermost position as also appears from Fig. 4. Stated more particularly it drives the upper die 20 and the larger piston 16 is well as the small piston 14 downwardly relative to the fixed die plate 10 until the bellows corrugations are completely formed about the die rings 30, and the said large piston 16 is substantially withdrawn from its chamber 15. Thus during this final operative phase a modifying of the fluid volume occurs at both chambers 13, 15 and also at the bellows blank b. It will be readily appreciated that the volume lost to the tube blank b by its axial collapse exceeds, for most bellows designs, the volume gained by its continued radial expansion, such that there is had generally a fluid flow or shift out of both the small piston chamber 13 and the bellows tube during this final phase. Accordingly the small and large pistons 14, 16, having the same rate and distance of advance, predeterminedly are differentiated in area such that the increase in the volume of chamber 15 exactly counterbalances and absorbs the combined fluid transfer from the said small chamber and tube blank. The ratio of the rate of change of bellows blank length to the rate of change of bellows blank volume is in this case constant or uniform, as represented for example by curve No. 1 of Fig. 1. It should be understood that without departing from the invention, means such as an eccentric cam or other coupling means between the ram 40 and piston 14 may readily be provided whereby any other desired schedule of volume-length relationships may be derived, such as illustrated by curves Nos. 2, 3, 4 of Fig. 1.

Generally stated, the operation of the a bellows-forming apparatus of the invention comprises the manipulation of a fluid volume sealed in communication with a tubular or cup shaped element in and by a simple, sure manner and means to effect exactly the desired radial bulging of said element. The herein described bellows-forming method and apparatus are seen to provide for the application of an hydraulic volume control in sure and precise concert with the bringing to bear of a mechanical contracting motion. Importantly, then, bellows manufacture in accordance with the invention is readily and accurately controlled and determined simply by the mechanical or physical proportioning of the apparatus components and is completely free from dependence upon the control or relief of fluid pressures and upon the proper adjustment and performance of an elaborate control system such as required thereby.

It should here be noted that bellows-forming devices appropriate to my novel volume control method are not limited to the assembly herein shown and described, and that the numerous modifications are equivalent embodiment may include apparatus designed more particularly for fashioning bellows from cup shaped elements.

From the foregoing it will be understood that the present invention provides a new and improved bellows-forming method and apparatus wherein the corrugating of a tube or cup member is effected by an extraordinarily simple mechanical manipulation of a correspondingly simple and efficient device. It has been shown to be characterized further and importantly by the novel ordering and more particularly the volume control of a fluid circuit sealed in communication with said tubular or cup shaped member. Those skilled in the art will readily appreciate still further that the elimination of pressure generation, control, or relief, and of the elaborate regulating system such as usually attendant thereon in accordance with this invention can decrease the cost of bellows manufacture, in that it permits the use of more varied and less costly materials, simplifies the forming process, and reduces the percentage of stock lost as rejects or otherwise.

It will be understood that my invention, either as to product, means or method, is not limited to the exemplary embodiment or steps herein illustrated or described, and I set forth its scope in my following claims.

I claim:

1. Bellows-forming apparatus comprising a fixed die plate receiving one end of a workable hollow blank and having a piston chamber at and communicating with said end, a second piston chamber spaced from and communicating with the first chamber and with the blank, pistons movable in said chambers, a relatively movable die plate at which the other end of the blank is closed, said movable die plate having the first piston rigidly connected to move with it, resilient means urging said movable die plate away from the fixed die plate, said chambers with the blank interior and the communications between them defining a sealed fluid system of determined total volume of which the volume portions defined in said chambers and blank are differentially variable with movement of the pistons, and means to move the second piston and in continuing movement thereof to effect closing of the die plates and differential chamber-volume-modifying movement of the first chamber piston thereby to start and complete corrugation of the blank under predetermined differential volume variation in the blank and the chambers correlated to the die closing and while maintaining constant the total volume in said system.

2. In the manufacture of metal walled bellows by forming apparatus of the type having opposed dies and interposed rings for engaging the ends and spaced annuli of a hollow metal blank, the process which comprises connecting a movable walled fluid system to and to include the interior of said blank, filling and sealing the fluid system in a manner to define with the blank a determined total confined fluid volume, deflecting the fluid system inwardly to shift to said blank a volume fraction calculated to effect desired initial bulging of the blank intermediate its engagement by said interposed rings, and then closing said dies and rings to collapse the blank and manipulating the fluid system in scheduled relation to said closing so as to maintain in said blank a volume fraction calculated to effect desired final bulging of the blank coincident with its axial collapse by said dies and rings.

References Cited in the file of this patent

UNITED STATES PATENTS

| | | |
|---|---|---|
| 1,698,210 | Bezzenberger | Jan. 8, 1929 |
| 1,946,472 | Babock | Feb. 13, 1934 |
| 2,048,588 | Babock | July 21, 1936 |
| 2,129,120 | Davis | Sept. 6, 1938 |